(12) United States Patent
Terada et al.

(10) Patent No.: US 8,910,598 B2
(45) Date of Patent: Dec. 16, 2014

(54) VEHICLE INTERNAL COMBUSTION ENGINE

(75) Inventors: Koji Terada, Saitama (JP); Kenichiro Nakamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 910 days.

(21) Appl. No.: 12/720,405

(22) Filed: Mar. 9, 2010

(65) Prior Publication Data

US 2010/0242870 A1     Sep. 30, 2010

(30) Foreign Application Priority Data

Mar. 31, 2009   (JP) ................... 2009-087282

(51) Int. Cl.
*F02B 75/22*  (2006.01)
*F16H 57/02*  (2012.01)
*F02B 61/02*  (2006.01)
*F02B 67/04*  (2006.01)

(52) U.S. Cl.
CPC ......... *F02B 61/02* (2013.01); *F16H 2057/0203* (2013.01); *F16H 57/02* (2013.01); *Y02T 10/148* (2013.01); *F02B 75/22* (2013.01); *F02B 67/04* (2013.01)
USPC ...................................... 123/54.4

(58) Field of Classification Search
CPC .......... F02B 67/04; F02B 61/02; F02B 75/22; F16H 57/02; F16H 2057/0203
USPC .................... 123/54.1, 54.4, 195 R
See application file for complete search history.

(56) References Cited

U.S. PATENT DOCUMENTS

| | | | |
|---|---|---|---|
| 5,024,113 A * | 6/1991 | Ito et al. .............................. 74/6 |
| 5,186,078 A * | 2/1993 | Kameda et al. ............. 74/606 R |
| 2005/0081664 A1* | 4/2005 | Kawakubo et al. .......... 74/337.5 |
| 2005/0229894 A1* | 10/2005 | Okano et al. ............... 123/197.1 |
| 2007/0295159 A1* | 12/2007 | Nishi et al. .................. 74/606 R |

FOREIGN PATENT DOCUMENTS

| | | |
|---|---|---|
| JP | 58-46832 U | 3/1983 |
| JP | 63-48995 U | 4/1988 |
| JP | 2-104919 A | 4/1990 |
| JP | 2000-343968 A | 12/2000 |

* cited by examiner

*Primary Examiner* — Lindsay Low
*Assistant Examiner* — Jacob Amick
(74) *Attorney, Agent, or Firm* — Birch, Stewart, Kolasch & Birch, LLP (57) ABSTRACT

A vehicle internal combustion engine wherein the vertical height of a crankcase is made short in addition to making short the anteroposterior (front to back) length of the crankcase. A vehicle internal combustion engine is configured such that a crankshaft, a main shaft, a counter shaft and an output shaft are arranged in parallel in a crankcase with the main shaft being disposed to the rear of the crankshaft and the counter shaft is disposed to the rear of the main shaft. The output shaft is disposed below and forward of the counter shaft.

18 Claims, 4 Drawing Sheets

VEHICLE INTERNAL COMBUSTION ENGINE

CROSS-REFERENCE TO RELATED APPLICATIONS

The present application claims priority under 35 USC 119 to Japanese Patent Application No. 2009-087282 filed on Mar. 31, 2009 the entire contents of which are hereby incorporated by reference.

BACKGROUND OF THE INVENTION

1. Field of the Invention

The present invention relates to a vehicle internal combustion engine having a crankshaft, a main shaft, a counter shaft and an output shaft arranged in parallel.

2. Description of Background Art

An internal combustion engine is known wherein a crankshaft, a main shaft, a counter shaft and an output shaft are arranged in parallel in a crankcase vertically halved into an upper case member and a lower case member. In this vehicle internal combustion engine, the crankshaft is provided at a mating surface of the crankcase. The main shaft is disposed vehicle-rearward of the crankshaft and above the mating surface of the crankcase. Main shaft-side driven gears, adapted to receive the power of the crankshaft transmitted thereto, are installed on the main shaft. The counter shaft, adapted to receive the power transmitted thereto from the main shaft, is disposed vehicle-rearward of the crankshaft and on the mating surface of the crankcase. In this way, the anteroposterior length of the internal combustion engine is made short. In addition, an output shaft is adapted to receive the power transmitted thereto from the countershaft and is disposed vehicle-rearward of the counter shaft. See, for example, Japanese Patent Laid-open No. 2000-343968.

However, in the conventional configuration described above, the main shaft-side driven gears secured to the main shaft have very large diameters; therefore, the crankcase protrudes upward, which causes restriction on the arrangement of auxiliaries, etc.

SUMMARY AND OBJECTS OF THE INVENTION

It is an object of an embodiment of the present invention to solve the problem of the conventional technique described above and to provide a vehicle internal combustion engine in which the vertical height of a crankcase is made short in addition to making short the anteroposterior (front to back) length of the crankcase.

According to an embodiment of the present invention, a vehicle internal combustion engine is provided in which a crankshaft, a main shaft, a counter shaft and an output shaft are arranged in parallel in a crankcase with the main shaft being disposed rearward of the crankshaft. The counter shaft is disposed rearward of the main shaft, and the output shaft is disposed below and forward of the counter shaft.

With the above configuration, the main shaft is disposed rearward of the crankshaft and the counter shaft is disposed rearward of the main shaft. That is to say, the crankshaft, the main shaft and the counter shaft are arranged from the front and to the back in this order. Therefore, the vertical height of the crankcase can be made short. In this case, for example, although the main shaft-side driven gear secured to the main shaft has a large diameter, it does not protrude upward. Therefore, it is possible to suppress the upward protrusion of the crankcase. In addition, since the output shaft is disposed forward of and below the counter shaft, the anteroposterior length (front to back) of the crankcase can be made short.

In the above configuration, the crankcase of the internal combustion engine may include the vertically halved upper and lower case members and the main shaft and the counter shaft may be disposed on the mating surface between the upper and lower case members.

With the above configuration, since the main shaft and the counter shaft are arranged on the mating surface between the upper and lower case members, the bearing structure of the main shaft and of the counter shaft is simplified so that the assembly of the main shaft and the counter shaft is facilitated.

In the above configuration, the shift drum adapted to switch a combination of gears on the main shaft and the counter shaft may be disposed above and between the main shaft and the counter shaft.

With the above configuration, since the shift drum is disposed by effectively using the space between the main shaft and the counter shaft, the anteroposterior length and vertical height of the crankcase can be made short.

In the above configuration, the internal combustion engine is a V-type internal combustion engine having cylinders arranged in a V-shape.

Even in the above configuration, the main shaft is disposed rearward of the crankshaft and the counter shaft is disposed rearward of the main shaft so that the crankshaft, the main shaft and the counter shaft are arranged from the front to the back in this order. Therefore, the vertical height of the crankcase can be made short. In this case, for example, although the main shaft-side driven gear secured to the main shaft has a large diameter, it does not protrude upward. Therefore, it is possible to suppress the upward protrusion of the crankcase. In addition, since the output shaft is disposed forward of and below the counter shaft, the anteroposterior (front to back) length of the crankcase can be made short.

According to an embodiment of the present invention, the main shaft is disposed rearward of the crankshaft and the counter shaft is disposed rearward of the main shaft so that the crankshaft, the main shaft and the counter shaft are disposed from the front to the back in this order. Therefore, the vertical height of the crankcase can be made short. In addition, since the output shaft is disposed forward of and below the counter shaft, the anteroposterior (front to back) length of the crankcase can be made short. Thus, the internal combustion engine can be downsized. The anteroposterior (front to back) length of the crankcase is made short to shorten e.g. the wheelbase. Thus, the vehicle can be made compact and the turning performance of the vehicle can be enhanced.

The crankcase includes the vertically halved upper and lower case members and the main shaft and the counter shaft are disposed on the mating surface between the upper and lower case members. Therefore, the bearing structure of the main shaft and of the counter shaft can be simplified so that the assembly of the main shaft and of the counter shaft is facilitated.

The shift drum adapted to switch the combination of the gears on the main shaft and the counter shaft is disposed above and between the main shaft and the counter shaft. Therefore, since the shift drum is disposed by effectively using the space between the main shaft and the counter shaft, the anteroposterior (front to back) length and vertical height of the crankcase can be made short. As a result, the distance between the shift drum and the main shaft and between the shift drum and the counter shaft can be reduced, whereby the internal combustion engine can be reduced in size and in weight.

Further, although the internal combustion engine is a V-type internal combustion engine, the main shaft is disposed rearward of the crankshaft and the counter shaft is disposed rearward of the main shaft so that the crankshaft, the main shaft and the counter shaft are disposed from the front to the back in this order. Therefore, the vertical height of the crankcase can be made short. Thus, it is possible to dispose auxiliaries between the cylinders and the crankcase, for example. In addition, since the output shaft is disposed forward of and below the counter shaft, the anteroposterior (front to back) length of the crankcase can be made short, whereby the internal combustion engine can be downsized. Since the anteroposterior (front to back) length of the crankcase is made short to shorten e.g. the wheelbase. Thus, the vehicle can be made compact and the turning performance of the vehicle is enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention will hereinafter be described with reference to the drawings.

Figure 1:
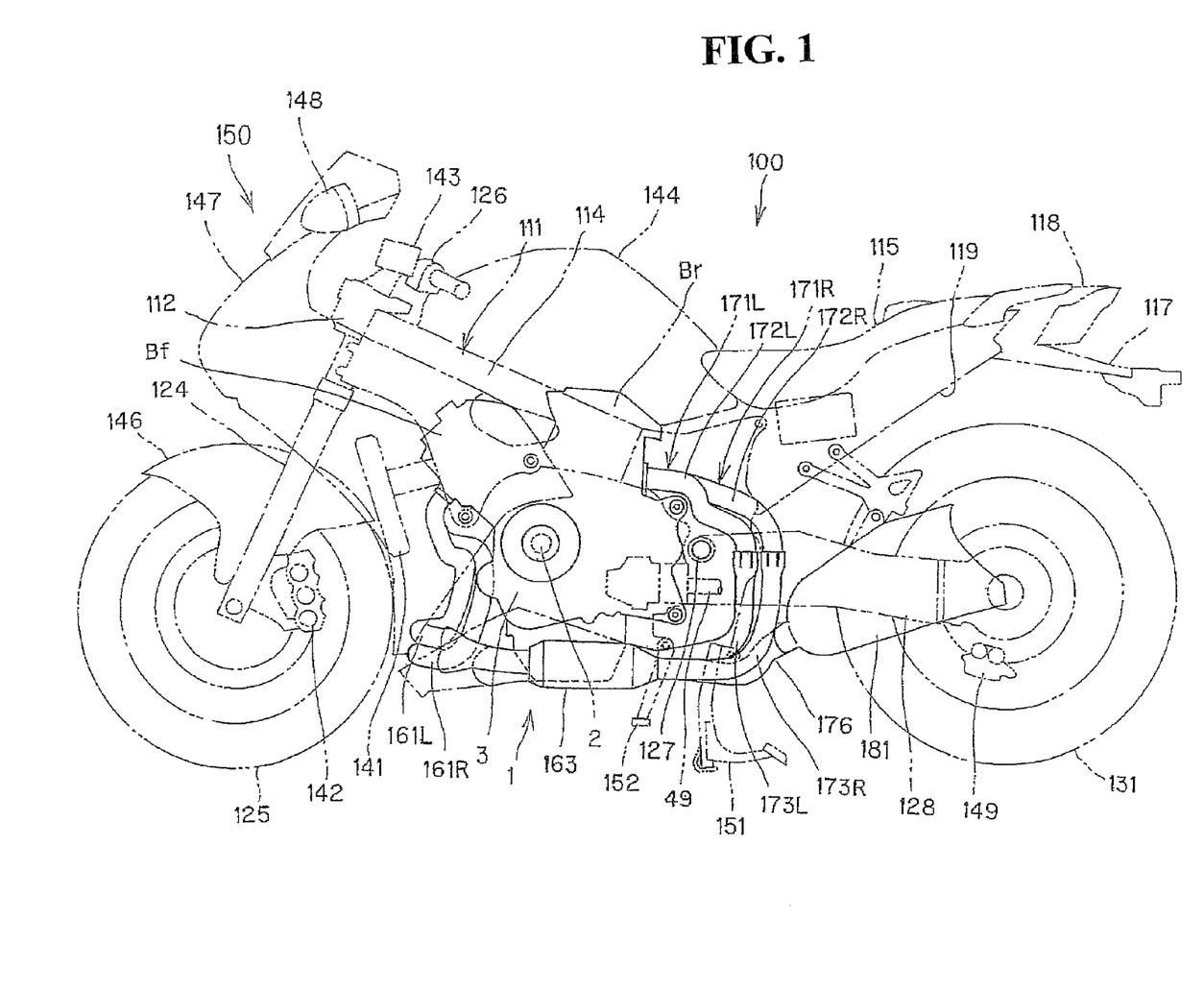
FIG. 1 is a lateral view of a motorcycle on which an internal combustion engine according to an embodiment of the invention is mounted.

FIG. 1 is a lateral view of a motorcycle on which an internal combustion engine according to the embodiment of the present invention is mounted. In the following explanation, the descriptions of directions such as the front, rear, left, right, upside and downside are based on the direction of a vehicle body.

A body frame 111 of a motorcycle 100 includes a head pipe 112 located in a front portion of a vehicle body; main frames 114 extending rearwardly from the head pipe 112 to the center of the vehicle body; and rear frames (not illustrated) extending from rear ends of the main frames 114 to a rear portion of the vehicle.

A front fork 124 is turnably coupled to the head pipe 112. A front wheel 125 is rotatably supported by the lower end of the front fork 124. A steering handlebar 126 is mounted to the upper portion of the head pipe 112. In FIG. 1, a front wheel brake 142 and a front master cylinder 143 are provided.

A front-rear V-type 4-cylinder internal combustion engine 1 is disposed below the main frames 114. This internal combustion engine 1 is transversely installed such that a crankshaft 2 is oriented in a left-right horizontal direction. The engine 1 is of an OHC, water-cooled type and has a crankcase 3. A front bank (cylinder) Bf and a rear bank (cylinder) Br each including two cylinders are formed in a V-shape so as to be tilted forward and rearward, respectively, from the crankcase 3 and to have a bank angle smaller than 90 degrees.

A pair of left and right exhaust pipes 161L, 161R are connected at one ends to exhaust ports of the front bank Bf. The exhaust pipes 161L, 161R extend downward from the exhaust ports, then extend toward the rear of the vehicle body, and are connected to a cylindrical catalyst device 163 located below the crankcase 3. Each of a pair of left and right exhaust pipes 171L, 171R are connected at one end to exhaust ports of the rear bank Br. The exhaust pipe 171L is configured to include an upper exhaust pipe 172L extending downward from the exhaust port and a lower exhaust pipe 173L extending downward from the upper exhaust pipe 172L, then further extending toward the front of the vehicle body, and is connected to the catalyst device 163. Similarly, the exhaust pipe 171R is configured to include an upper exhaust pipe 172R extending downward from the exhaust port and a lower exhaust pipe 173R extending downward from the upper exhaust pipe 172R, then further extending toward the front of the vehicle body, and is connected to the catalyst device 163. The catalyst 163 is connected via a single exhaust pipe 176 to a muffler 181 disposed rearward of the internal combustion engine 1.

A pivot shaft 127 is provided rearward of the internal combustion engine 1. A rear fork 128 is attached to the pivot shaft 127 so as to be vertically swingable around the pivot shaft 127. A rear wheel 131 is rotatably supported by the rear end portion of the rear fork 128. A rear wheel brake 149 is attached to the rear wheel 131. The rear wheel 131 and the internal combustion engine 1 are connected by a drive shaft 49 installed in the rear fork 128. The rotary power from the internal combustion engine 1 is transmitted via the drive shaft 49 to the rear wheel 131. A rear shock absorber (not shown) is spanned between the rear fork 128 and the body frame 111 to absorb impact from the rear fork 128.

A stand 151 for parking the vehicle body is provided at the rear portion of the internal combustion engine 1. A side stand 152 is provided at a lower portion of a left lateral surface of the internal combustion engine 1.

A radiator 141 is disposed in front of the internal combustion engine 1. A fuel tank 144 is mounted on the upper portion of the main frame 114 so as to cover the internal combustion engine 1 from above. A seat 115 is located rearward of the fuel tank 144 and supported by the rear frames. A tail lamp 118 is disposed rearward of the seat 115. A rear fender 117 is disposed below the tail lamp 118 to cover the rear wheel 131 from above.

The motorcycle 100 has a resin-made body cover 150 covering the vehicle body. The body cover 150 includes a front cover 147 continuously covering from the front of the body frame 111 to the front portion of the internal combustion engine 1. A mirror 148 is attached to the upper portion of the front cover 147. A front fender 146 is attached to the front fork 124 to cover the front wheel 125 from above.

Figure 2:
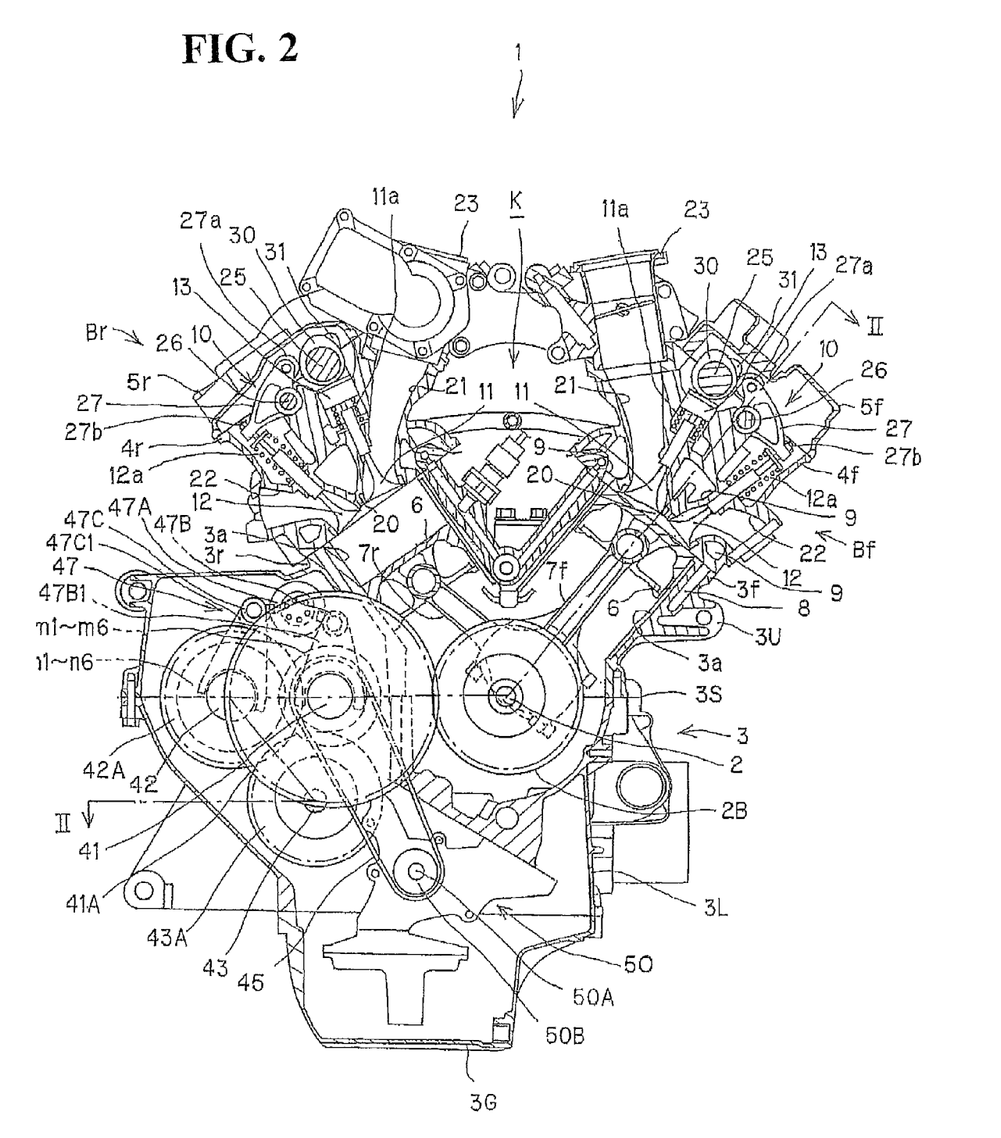
FIG. 2 is a cross-sectional view illustrating an internal combustion engine.

FIG. 2 is a cross-sectional view of the internal combustion engine 1. In addition, the description is given with the upside and downside of the figure taken as the upside and downside, respectively, of the internal combustion engine 1 and with the right side and left side of the figure taken as the front side and rear side, respectively, of the engine 1.

A V-bank space K which is a space formed in a V-shape as viewed from the side is formed between the front bank Bf and the rear bank Br.

The crankcase 3 is configured to be vertically split into an upper crankcase (an upper case member) 3U and a lower crankcase (a lower case member) 3L. A crankshaft 2 is rotatably supported so as to be put between the crankcases 3U, 3L. The upper crankcase 3U is formed integrally with a front cylinder block 3f and a rear cylinder block 3r each of which has two cylinders arranged right and left and which extend obliquely upward to form a V-shape as viewed from the side.

An oil pan 3G for storing oil (lubricating oil) of the internal combustion engine 1 therein is provided at a lower portion of the lower crankcase 3L so as to protrude downward. An oil pump 50 for circulating oil in the internal combustion engine 1 is located below the crankshaft 2 in the lower crankcase 3L.

A front cylinder head 4f is placed from the oblique front on the front cylinder block 3f and fastened thereto by means of fastening bolts (not shown). In addition, a front cylinder head cover 5f covers the front cylinder head 4f from above. Similarly, a rear cylinder head 4r is placed from the oblique rear on the rear cylinder block 3r and fastened thereto by means of fastening bolts (not shown). In addition, a rear cylinder head cover 5r covers the rear cylinder head 4r from above.

The front cylinder block 3f and the rear cylinder block 3r are each formed with a cylinder bore 3a. A piston 6 is disposed so as to reciprocate in the cylinder bore 3a. The pistons 6 are connected via corresponding connecting rods 7f, 7r to the single common crankshaft 2.

The cylinder blocks 3f, 3r are provided with respective water jackets 8 which surround the corresponding cylinder bores 3a and in which cooling water flows to cool the corresponding cylinder blocks 3f, 3r.

The front cylinder head 4f and the rear cylinder head 4r are provided with combustion chambers 20, intake ports 21 and exhaust ports 22 which are located above the corresponding cylinder bores 3a. A throttle body 23 is connected to each of the intake ports 21 to adjust the amount of mixture flowing to the intake port 21.

The cylinder heads 4f, 4r are provided with respective water jackets 9 which surround the intake ports 21 and the exhaust ports 22 and in which cooling water flows to cool the cylinder heads 4f, 4r.

A pair of intake valves 11 are arranged on each of the cylinder heads 4f, 4r in an openable and closable manner so as to be biased by corresponding valve springs 11a in a direction of closing the intake ports 21. A pair of exhaust valves 12 are arranged on each of the cylinder heads 4f, 4r in an openable and closable manner so as to be biased by corresponding valve springs 12a in a direction of closing the exhaust ports 22.

The intake valves 11 and the exhaust valves 12 are drivingly opened and closed by a uni-cam type valve train 10 in which the intake valves 11 and the exhaust valves 12 are driven by a camshaft 25 disposed for each of the cylinder heads 4f, 4r.

The valve train 10 includes a camshaft 25 located above the intake valves 11 and rotatably supported by each of the cylinder heads 4f, 4r; a rocker shaft 26 having an axis parallel to the camshaft 25 and secured to each of the cylinder heads 4f, 4r; and a rocker arm 27 swingably supported by the rocker shaft 26.

The camshaft 25 has intake cams 30 and exhaust cams 31 which project toward the outer circumferential side of the camshaft 25 and is rotated in synchronization with the rotation of the crankshaft 2. The intake cam 30 and the exhaust cam 31 each have a cam profile with an irregular distance (radius) from the center to the outer circumference. The variations of the radius encountered when the intake cam 30 and the exhaust cam 31 are rotated move the intake valves 11 and the exhaust valves 12 upward and downward.

A valve lifter 13 is disposed between the camshaft 25 and the intake valve 11 so as to be slidably fitted to each of the cylinder heads 4f, 4r at a position below the camshaft 25.

A roller 27a is provided at one end of the rocker arm 27 pivotally supported by the rocker shaft 26 so as to be in rolling-contact with the exhaust cam 31. In addition, a tappet screw 27b is screwed to the other end of the rocker arm 27 so as to be abutted against the upper end of the exhaust valve 12 and to be able to adjust its advancing and retreating position.

If the intake cams 30 and the exhaust cams 31 are rotated along with the camshaft 25, the intake cams 30 depress the intake valves 11 via the valve lifters 13 and the exhaust cams 31 depress the exhaust valves 12 via the rocker arms 27. Thus, the intake ports 21 and the exhaust ports 22 are opened and closed at predetermined timings determined depending on the rotational phase of the intake cam 30 and of the exhaust cam 31.

Figure 3:
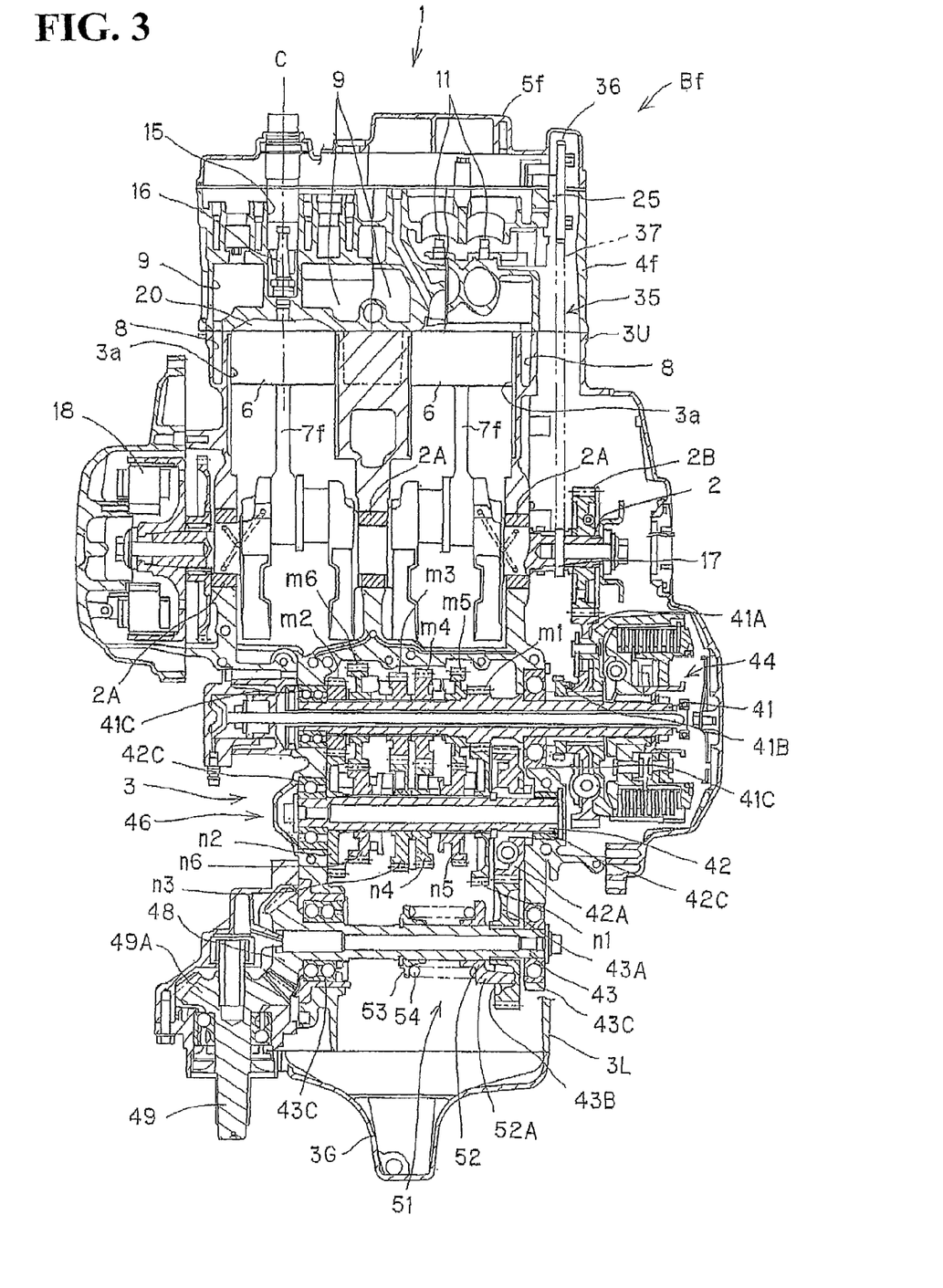
FIG. 3 is a cross-sectional view taken along line II to II of FIG. 2.
Figure 4:
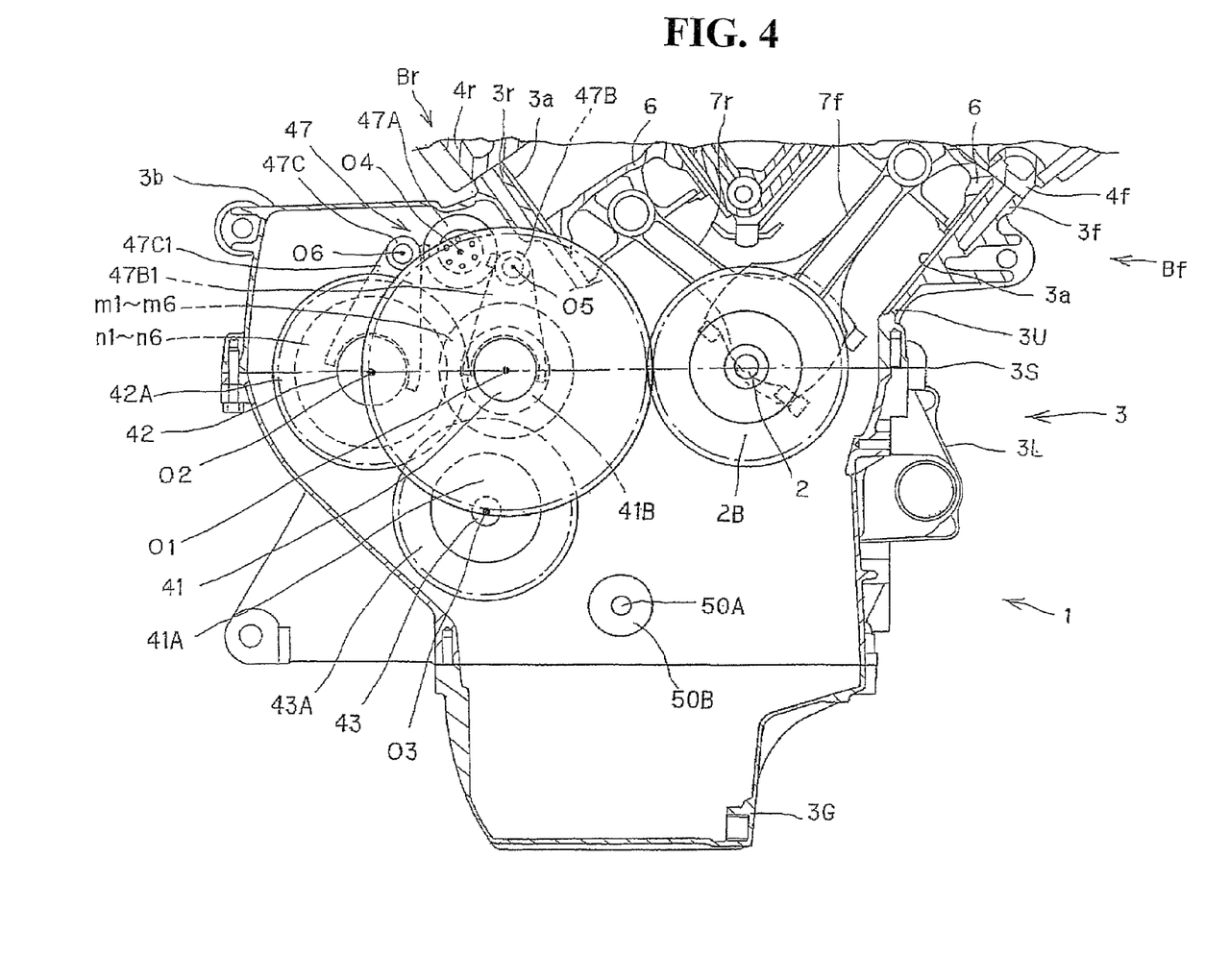
FIG. 4 is a cross-sectional view illustrating the arrangement relationship among a crankshaft, a main shaft, a counter shaft and an output shaft.

FIG. 3 is a cross-sectional view taken along line II to II of FIG. 2. FIG. 4 is a cross-sectional view illustrating an arrangement relationship among the crankshaft, the main shaft, the counter shaft and an output shaft. FIG. 3 illustrates the cross-section of the front bank Bf. However, the inside of the rear bank Br is configured similarly to that of the front bank Bf; therefore, the explanation of the rear bank Br is omitted. In FIG. 4, the upside and downside are taken as the upside and downside, respectively, of the internal combustion engine 1 and the right side and left side in FIG. 4 are taken as the front side and rear side, respectively, of the engine 1.

As illustrated in FIG. 3, each cylinder of the cylinder head 4f is formed with a plug insertion hole 15 on a cylinder axis C which is a central axis of the cylinder bore 3a. An ignition plug 16 (the ignition plug of the right cylinder is not illustrated in the figure) is disposed in the plug insertion hole 15 so as to have a leading end facing the inside of the combustion chamber 20.

The crankshaft 2 is supported in the crankcase 3 by a plurality of journal bearings 2A provided at both end portions and an intermediate portion in the axial direction.

A camshaft drive sprocket 17, adapted to output the rotation of the crankshaft 2, is provided at one end side of the crankshaft 2. A cam chain chamber 35 vertically extending in each of the banks Bf, Br is provided on the side of the camshaft drive sprocket 17 of the internal combustion engine 1. A driven sprocket 36 is secured by one end of the camshaft 25 and located in the cam chain chamber 35 so as to be rotated integrally with the camshaft 25. A cam chain 37 is wound around the driven sprocket 36 and the camshaft drive sprocket 17. The camshaft 25 is rotated at a rotary speed half that of the crankshaft 2 via the cam chain 37 and the driven sprocket 36.

A generator 18 as an electric dynamo is mounted to the other end side of the crankshaft 2.

The main shaft 41, the counter shaft 42 and the output shaft 43 are installed in the crankcase 3 in parallel to the crankshaft 2. These shafts including the crankshaft 2 constitute a gear transmission mechanism adapted to transmit the rotation of the crankshaft 2 in the order of the main shaft 41, the counter shaft 42 and the output shaft 43.

As illustrated in FIG. 4, the crankshaft 2 is disposed on a mating surface 3S between the upper crankcase 3U and the lower crankcase 3L. The main shaft 41 is disposed rearward of the crankshaft 2 and the counter shaft 42 is disposed rearward of the main shaft 41. The main shaft 41 and the counter shaft 42 are disposed on the mating surface 3S. The output shaft 43 is disposed forward of and below the counter shaft 42. In other words, respective axial centers O1, O2 of the main shaft 41 and counter shaft 42 are located back and forth on the mating surface 3S. An axial center O3 of the output shaft 43 is located rearward of the axial center O1 of the main shaft 41 and forward of and below the axial center O2 of the counter shaft 42.

FIG. 3 is a cross-sectional view taken along a cross-section connecting together the front bank Bf, the crankshaft 2, the main shaft 41, the counter shaft 42 and the output shaft 43 with straight lines.

A crank-side drive gear 2B, adapted to rotate the main shaft 41, is secured to an end of the crankshaft 2 close to the cam chain chamber 35. The crank-side drive gear 2B meshes with a main shaft-side driven gear 41A of the main shaft 41. The main shaft 41 is supported by bearings 41C provided on both sides thereof.

The main shaft-side driven gear 41A is provided on the main shaft 41 so as to be rotatable relatively thereto and is connected to a clutch mechanism 44. The operation of the clutch mechanism 44 can connect and disconnect the transmission of the power between the crankshaft 2 and the main shaft 41.

The main shaft-side driven gear 41A is provided with an oil pump drive gear 41B adapted to drive an oil pump 50 (see FIG. 2). The oil pump drive gear 41B is rotated integrally with the main shaft-side driven gear 41A regardless of the engagement or disengagement of the clutch mechanism 44. Thus, as illustrated in FIG. 2, the rotation of the crankshaft 2 is transmitted via the drive chain 45 to the driven gear 50B secured to the drive shaft 50A of the oil pump 50 for driving the oil pump 50.

As illustrated in FIG. 3, the counter shaft 42 is supported by bearings 42C provided at both ends thereof. Speed-change gear groups are arranged to straddle between the countershaft 42 and the main shaft 41, which constitutes a transmission 46. More specifically, drive gears m1 to m6 for 6 speeds are provided on the main shaft 41. Driven gears n1 to n6 for 6 speeds are provided on the counter shaft 42. The drive gears m1 to m6 are each engaged with a corresponding one of the driven gears n1 to n6 for each speed-change stage to constitute a speed-change gear pair (a combination of the gears). In addition, the speed-change gear pairs are reduced in reduction ratio in the order from first-speed to sixth-speed (to become higher-speed gears). A first-speed gear pair m1, n1 largest in reduction ratio is disposed on one end side of the main shaft 41 supporting the main shaft-side driven gear 41A and a second-speed gear pair m2, n2 is disposed on the other end side of the main shaft 41. A fifth-speed gear pair m5, n5, a fourth-speed gear pair m4, n4, a third-speed gear pair m3, n3 and a sixth-speed gear pair m6, n6 are arranged in the order from one end side between the first-speed gear pair m1, n1 and the second-speed gear pair m2, n2.

The third-speed drive gear m3 and the fourth-speed drive gear m4 on the main shaft 41 are spline-connected to the main shaft 41 and are configured to be axially moved as a shifter and be selectively engageable with and disengageable from the fifth-speed drive gear m5 or sixth-speed drive gear m6 adjacent respectively to the fourth-speed drive gear m4 and the third-speed drive gear m3. The fifth-speed driven gear n5 and the sixth-speed driven gear n6 on the counter gear 42 are spline-connected to the counter shaft 42 and are configured to be axially moved as a shifter and be engageable with and disengageable from the fourth-speed driven gear n4 or the third-speed driven gear n3 adjacent respectively to the fifth-speed driven gear n5 and the sixth-speed driven gear n6.

The third-speed drive gear m3 and the fourth-speed drive gear m4, as a shifter, on the main shaft 41 and the fifth-speed driven gear n5 and sixth-speed driven gear n6 on the counter shaft 42 are moved by a shift changeover mechanism 47 (see FIG. 4) for shifting.

As illustrated in FIG. 4, the shift changeover mechanism 47 includes a shift drum 47A parallel to the shafts 41 to 43. The shift drum 47A is disposed above and between the main shaft 41 and the counter shaft 42 so as to have an axial center O4 rearward of the axial center O3 of the output shaft 43. Fork shafts 47B and 47C are arranged forward and rearward, respectively, of and parallel to the shift drum 47A. The fork shaft 47B is disposed forward of the shift drum 47A so as to have an axial center O5 slightly below the axial center O4 of the shift drum 47A. The fork shaft 47C is disposed rearward of the shift drum 47A so as to have an axial center O6 located at the same height as the axial center O4 of the shift drum 47A.

A shift fork 47B1 engaged with the shifter of the main shaft 41 is supported by the fork shaft 47B. A shift fork 47C1 engaged with the shifter of the counter shaft 42 is supported by the fork shaft 47C. The speed-change gear pair is changed by moving the shift forks 47B1, 47C1 of the shift changeover mechanism 47. The rotation of the main shaft 41 is transmitted to the counter shaft 42 via the speed-change gear pair thus changed. As illustrated in FIG. 3, the counter shaft 42 has an intermediate drive gear 42A adapted to transmit the rotation of the counter shaft 42 to the output shaft 43.

The output shaft 43 is supported by bearings 43C attached to both ends of the output shaft 43 and has a driven gear 43A meshing with the intermediate drive gear 42A. A cam-type torque damper 51 is disposed on the output shaft 43 adjacently to the driven gear 43A. The cam-type torque damper 51 is adapted to absorb torque variation applied thereto and includes a cylindrical member 52 axially movably spline-connected to the output shaft 43. The cylindrical member 52 is formed on an end surface close to the driven gear 43A with a projecting cam 52A engaged with a recessed cam 43B formed on the driven gear 43A. A spring-receiving member 53 is secured to a general center of the output shaft 43. A coil spring 54 is provided between the cylindrical member 52 and the spring-receiving member 53 so as to bias the cylindrical member 52 toward the driven gear 43A. The cam-type torque damper 51 is configured to include the cylindrical member 52, the spring-receiving member 53 and the coil spring 54.

A drive bevel gear 48 is provided integrally with the left end portion of the output shaft 43. The drive bevel gear 48 meshes with a driven bevel gear 49A provided integrally with the front end of the drive shaft 49 extending in the back and forth direction of the vehicle body. In this way, the rotation of the output shaft 43 is transmitted to the drive shaft 49.

The operation of the internal combustion 1 is next described with reference to FIG. 4.

In the internal combustion engine 1 configured as described above, the crankshaft 2, the main shaft 41, and the counter shaft 42 are arranged from the front to the rear in this order. Therefore, the vertical height of the crankcase 3 can be made short. In this configuration, although the diameter of the main shaft-side driven gear 41A secured to the main shaft 41 is large, it does not protrude upward compared with the case where the main shaft is arranged above the crankshaft and the counter shaft. Therefore, it is possible to prevent the upward protrusion of the crankcase 3. Thus, it is possible to arrange auxiliaries between the rear bank Br and the upper surface 3b of the crankcase 3.

Further, the main shaft 41 and the counter shaft 42 are disposed on the mating surface 3S between the upper and lower crankcases 3U, 3L. Therefore, the respective bearings 41C and 42C of the main shaft 41 and the counter shaft 42 can be simplified in configuration. Thus, the main shaft 41 and the counter shaft 42 can be assembled with ease.

Since the output shaft 43 can be disposed forward of the counter shaft 42, the anteroposterior (front to back) length of the crankcase 3 can be made short compared with the case where the output shaft 43 is disposed rearward of the counter shaft 42. The output shaft 43 is disposed at an apex of a triangle while the main shaft 41 and the counter shaft 42 are disposed at the other respective apexes. The output shaft 43 is disposed by effectively using the space between the main shaft 41 and the counter shaft 42. Therefore, the downward protrusion of the crankcase 3 resulting from the output shaft 43 disposed forward of the counter shaft 42 can be suppressed. Thus, the vertical height of the crankcase 3 can be made short in addition to making short the anteroposterior (front to back) length of the crankcase 3, whereby the internal combustion engine 1 can be reduced in size and in weight.

In this way, since the anteroposterior length of the crankcase 3 is made short to shorten the wheelbase, the motorcycle 100 (see FIG. 1) can be made compact and the turning performance of the motorcycle 100 can be enhanced.

The shift drum 47A is disposed above and between the main shaft 41 and the counter shaft 42. Therefore, the anteroposterior length of the crankcase 3 can be made short compared with the case where the shift drum 47A is disposed rearward of the counter shaft 42. The shift drum 47A is disposed at an apex of a triangle while the main shaft 41 and the counter shaft 42 are disposed at the other respective apexes. The shift drum 47A is disposed by effectively using the space between the main shaft 41 and the counter shaft 42. Therefore, the upward protrusion of the crankcase 3 resulting from the shift drum 47A disposed above the main shaft 41 and the counter shaft 42 can be suppressed to make short the vertical height of the crankcase 3. Thus, auxiliaries can be disposed between the rear bank Br and the upper surface 3b of the crankcase 3. In addition, since the distance between the shift drum 47A and the main shaft 41 and between the shift drum 47A and the counter shaft 42 can be reduced, the shift forks 47B1, 47C1 supported by the respective fork shafts 47B, 47C can be shortened, whereby the internal combustion engine 1 can be reduced in size and in weight.

The shift drum 47A is disposed to have the axial center O4 rearward of the axial center O3 of the output shaft 43. Therefore, the vertical height of the crankcase 3 can be made short compared with the case where the axial center of the shift drum and the axial center of the output shaft are arranged one above the other. Thus, auxiliaries can be arranged between the rear bank Br and the upper surface 3b of the crankcase 3.

In addition to this, the fork shaft 47B is disposed at an apex of a triangle while the main shaft 41 and the shift drum 47A are disposed at the other respective apexes. The fork shaft 47B is disposed by effectively using the space between the main shaft 41 and the shift drum 47A. Therefore, the upward protrusion of the crankcase 3 resulting from the fork shaft 47B disposed above the main shaft 41 can reduce the vertical height of the crankcase 3. Thus, it is possible to dispose auxiliaries between the rear bank Br and the upper surface 3b of the crankcase 3. Since the distance between the fork shaft 47B and the main shaft 41 and between the fork shaft 47B and the shift drum 47A can be reduced, the shift fork 47B1 supported by the fork shaft 47B can be shortened, whereby the internal combustion engine 1 can be reduced in size and in weight.

Similarly, the fork shaft 47C is disposed at an apex of a triangle while the counter shaft 42 and the shift drum 47A are disposed at the other respective apexes. The fork shaft 47C is disposed by effectively using the space between the counter shaft 42 and the shift drum 47A. Therefore, the upward protrusion of the crankcase 3 resulting from the fork shaft 47C disposed above the counter shaft 42 can be suppressed to make short the vertical height of the crankcase 3. Thus, it is possible to dispose auxiliaries between the rear bank Br and the upper surface 3b of the crankcase 3. In addition, since the distance between the fork shaft 47C and counter shaft 42 and between the fork shaft 47C and the shift drum 47A can be reduced, the shift fork 47C1 supported by the fork shaft 47C can be shortened, whereby the internal combustion engine 1 can be reduced in size and in weight.

According to the present embodiment as described above, the main shaft 41 is disposed rearward of the crankshaft 2 and the counter shaft 42 is disposed rearward of the main shaft 41. Therefore, the crankshaft 2, the main shaft 41 and the counter shaft 42 are arranged back and forth in this order. Thus, the vertical height of the crankcase 3 can be made short. Consequently, although the main shaft-side driven gear 41A secured to the main shaft 41 has a large diameter, it does not protrude upward. Therefore, it is possible to suppress the upward protrusion of the crankcase 3.

Since the output shaft 43 is disposed forward of and below the counter shaft 42, the anteroposterior (front to back) length of the crankcase 3 can be made short, whereby the internal combustion engine 1 can be downsized. Since the anteroposterior (front to back) length of the crankcase 3 is made short to shorten the wheelbase, the motorcycle 100 can be made compact and the turning performance of the motorcycle 100 can be enhanced.

According to the present embodiment, the upper crankcase 3U and the lower crankcase 3L which are vertically partitioned are provided. In addition, the main shaft 41 and the counter shaft 42 are disposed on the mating surface 3S between the upper and lower crankcases 3U, 3L. Therefore, the respective bearings 41C and 42C of the main shaft 41 and the counter shaft 42 can be simplified in configuration. Thus, the main shaft 41 and the counter shaft 42 can be assembled with ease.

According to the present embodiment, the shift drum 47A, adapted to switch the combination of the gears on the main shaft 41 and the counter shaft 42, is disposed above and between the main shaft 41 and the counter shaft 42. Therefore, the shift drum 47A is disposed by effectively using the space between the main shaft 41 and the counter shaft 42. Thus, the anteroposterior and vertical heights can be made short. As a result, the distance between the shift drum 47A and the main shaft 41 and between the shift drum 47A and the counter shaft 42 can be made short to shorten the shift forks 47B1, 47C1, whereby the internal combustion engine 1 can be reduced in size and in weight.

Further, according to the present embodiment, although the internal combustion engine 1 is a V-type internal combustion engine in which the banks Bf, Br are arranged in a V-shape, the main shaft 41 is disposed rearward of the crankshaft 2 and the counter shaft 42 is disposed rearward of the main shaft 41. That is to say, the crankshaft 2, the main shaft 41 and the counter shaft 42 are arranged from the front to the back in this order. Thus, the vertical height of the crankcase 3 can be made short. In this case, although the main shaft-side driven gear 41A secured to the main shaft 41 has a large diameter, it does not protrude upward. Therefore, it is possible to suppress the upward protrusion of the crankcase 3. Thus, it is possible to dispose auxiliaries between the rear bank Br and the crankcase 3.

Since the output shaft 43 is disposed below and forward of the counter shaft 42, the anteroposterior (front to back) length of the crankcase 3 can be made short, whereby the internal combustion engine 1 can be downsized. Since the anteroposterior (front to back) length of the crankcase 3 can be made sort to shorten the wheelbase, the motorcycle 100 can be made compact and the turning performance of the motorcycle 100 can be enhanced.

The embodiment described above is a mode of the present invention and can appropriately be modified in various ways in a range not departing from the gist of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine for a vehicle, comprising:
a crankshaft;
a main shaft;
a counter shaft;
an output shaft; and
a shift drum adapted to switch a combination of gears on the main shaft and the counter shaft,
wherein the internal combustion engine is a V-type internal combustion engine having cylinders arranged in a V-shape,
the crankcase of the internal combustion engine includes vertically halved upper and lower case members, and
the shift drum is disposed in the upper case member in a position that is under a rear cylinder bank, above the counter shaft and the main shaft, forward with respect to the counter shaft, and rearward with respect to the main shaft,
said crankshaft, main shaft, counter shaft and output shaft is arranged in parallel in a crankcase, and
when the engine is viewed from a direction parallel to axes of the crankshaft, the main shaft, the counter shaft, and the output shaft,
the main shaft is seen to be disposed in a rearward direction of the vehicle with respect to the crankshaft, the counter shaft is seen to be disposed in the rearward direction of the vehicle with respect to the main shaft, and the output shaft is seen to be disposed below and in a forward direction of the vehicle with respect to the counter shaft, and
further comprising:
an oil pump;
a drive shaft of the oil pump located in a position under the rear cylinder bank and forward with respect to each of the main shaft and the output shaft; and
a drive chain for transmitting power from the main shaft on a horizontal mating surface to the drive shaft of the oil pump.

2. An internal combustion engine for a vehicle, comprising:
a crankshaft;
a main shaft;
a counter shaft;
an output shaft with a length substantially equal to a length of the counter shaft; and
a shift drum adapted to switch a combination of gears on the main shaft and the counter shaft,
wherein the internal combustion engine is a V-type internal combustion engine having cylinders arranged in a V-shape,
the crankcase of the internal combustion engine includes vertically halved upper and lower case members,
the shift drum is disposed in the upper case member in a position that is under a rear cylinder bank, above the counter shaft and the main shaft, and that is forward with respect to the counter shaft and rearward with respect to the main shaft, and
said crankshaft, main shaft, counter shaft and output shaft being arranged in parallel in a crankcase, and
when the engine is viewed from a direction parallel to axes of the crankshaft, the main shaft, the counter shaft, and the output shaft,
the main shaft is seen to be disposed in a rearward direction of the vehicle with respect to the crankshaft, the counter shaft is seen to be disposed in the rearward direction of the vehicle with respect to the main shaft, and the output shaft is seen to be disposed below and in a forward direction of the vehicle with respect to the counter shaft,
wherein the main shaft and the counter shaft are disposed on a horizontal mating surface between the upper and lower case members, and
further comprising:
an oil pump;
a drive shaft of the oil pump located in a position under the rear cylinder bank and forward with respect to each of the main shaft and the output shaft; and
a drive chain for transmitting power from the main shaft on the horizontal mating surface to the drive shaft of the oil pump.

3. The internal combustion engine according to claim 1, wherein the main shaft and the counter shaft are disposed on the horizontal mating surface between the upper and lower case members.

4. The internal combustion engine according to claim 1, wherein the crankshaft, the main shaft and the counter shaft have axes arranged from the front to the back in this order on a plane extending in a horizontal direction of the engine,
wherein a vertical height of the crankcase is made short, and
a planar-shaped upper portion of the crankcase facing upwardly toward the rear cylinder bank is arranged to be directly above the shift drum and to be nearly parallel to the horizontal mating surface between the upper and lower case members.

5. The internal combustion engine according to claim 1, wherein a main shaft-side driven gear and a clutch mechanism are secured to the main shaft, and are positioned offset from the engine, such that the clutch mechanism does not limit a distance between a crankshaft axis, a main shaft axis, and a counter shaft axis.

6. The internal combustion engine according to claim 5, wherein auxiliaries are disposed between the rear cylinder bank and the crankcase.

7. The internal combustion engine according to claim 1, wherein the output shaft is disposed forward of the counter shaft and below each of the shift drum, the counter shaft, and the main shaft.

8. The internal combustion engine according to claim 1, wherein the shift drum is disposed in the crankcase in a position that is under the rear cylinder bank.

9. The internal combustion engine according to claim 1, wherein the shift drum is disposed in the upper case member, and the output shaft is disposed in the lower case member.

10. An internal combustion engine for a vehicle comprising:
a crankcase;

a crankshaft, a main shaft, a counter shaft, and an output shaft arranged in parallel in the crankcase;

wherein the internal combustion engine is a V-type internal combustion engine configured with a front bank cylinder and a rear cylinder bank arranged back and forth in a V-shape, with the rear cylinder bank tilted rearwardly, wherein the crankcase of the internal combustion engine includes an upper case member and a lower case member which are vertically halved, and the crankshaft, the main shaft, and the counter shaft are disposed on a horizontal mating surface between the upper and lower case members, and when the engine is viewed from a direction parallel to axes of the crankshaft, the main shaft, the counter shaft, and the output shaft, the main shaft is seen to be disposed in a rearward direction of the vehicle with respect to the crankshaft;

the counter shaft is seen to be disposed in the rearward direction of the vehicle with respect to the main shaft; and the output shaft is seen to be disposed below and in a forward direction of the vehicle with respect to the counter shaft, the internal combustion engine further comprising:

a shift drum, adapted to switch a combination of gears on the main shaft and the counter shaft, is disposed above main shaft and the counter shaft, and forward with respect to the counter shaft and rearward with respect to the main shaft, and the shift drum is disposed, in a side view, at a position below the rear cylinder bank in a back and forth direction of the engine, wherein a planar-shaped upper portion of the crankcase facing upwardly toward the rear cylinder bank is arranged to be directly above the shift drum and to be nearly parallel to the horizontal mating surface between the upper and lower case members.

11. The internal combustion engine according to claim 2, wherein the crankshaft, the main shaft and the counter shaft have axes arranged from the front to the back in this order on a plane extending in a horizontal direction of the engine, wherein a vertical height of the crankcase is made short, and a planar-shaped upper portion of the crankcase facing upwardly toward the rear cylinder bank is arranged to be directly above the shift drum and to be nearly parallel to the horizontal mating surface between the upper and lower case members.

12. The internal combustion engine according to claim 10, wherein a main shaft-side driven gear and a clutch mechanism are secured to the main shaft, and are positioned offset from the engine, such that the clutch mechanism does not limit a distance between a crankshaft axis, a main shaft axis, and a counter shaft axis.

13. The internal combustion engine according to claim 12, wherein auxiliaries are disposed between the rear cylinder bank and the crankcase.

14. The internal combustion engine according to claim 10, wherein the output shaft is disposed forward of the counter shaft and below each of the shift drum, the counter shaft and the main shaft.

15. The internal combustion engine according to claim 10, further comprising:

an oil pump;

a drive shaft of the oil pump located in a position under the rear cylinder bank and forward with respect to each of the main shaft and the output shaft; and a drive chain for transmitting power from the main shaft on the horizontal mating surface to the drive shaft of the oil pump.

16. The internal combustion engine according to claim 10, wherein the shift drum is disposed in the upper case member, and the output shaft is disposed in the lower case member.

17. The internal combustion engine according to claim 10, wherein the shaft drum is disposed such that an axial center of the shift drum is arranged rearwardly of an axial center of the output shaft.

18. The internal combustion engine according to claim 2, further comprising:

an oil pump;

a drive shaft of the oil pump located in a position under the rear cylinder bank and forward with respect to each of the main shaft and the output shaft; and a drive chain for transmitting power from the main shaft on the horizontal mating surface to the drive shaft of the oil pump.

* * * * *